US009456402B2

(12) United States Patent
Linden et al.

(10) Patent No.: US 9,456,402 B2
(45) Date of Patent: *Sep. 27, 2016

(54) CONTROLLING COMMUNICATIONS IN RADIO-BASED AD HOC NETWORKS

(71) Applicant: Kyynel Ltd, Oulu (FI)

(72) Inventors: Toni Linden, Oulu (FI); Matti Raustia, Oulu (FI); Teemu Vanninen, Oulu (FI)

(73) Assignee: KYYNEL LTD, Oulu (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/598,724

(22) Filed: Jan. 16, 2015

(65) Prior Publication Data

US 2016/0212681 A1 Jul. 21, 2016

(51) Int. Cl.
| | |
|---|---|
| *H04W 40/00* | (2009.01) |
| *H04W 40/22* | (2009.01) |
| *H04L 12/24* | (2006.01) |
| *H04W 40/12* | (2009.01) |
| *H04W 40/20* | (2009.01) |
| *H04W 40/24* | (2009.01) |

(52) U.S. Cl.
CPC .......... *H04W 40/22* (2013.01); *H04L 41/0853* (2013.01); *H04W 40/12* (2013.01); *H04W 40/20* (2013.01); *H04W 40/246* (2013.01); *H04W 40/248* (2013.01)

(58) Field of Classification Search
CPC ... H04W 40/22; H04W 40/12; H04W 40/20; H04W 40/246; H04W 20/248; H04L 41/0853
USPC .......................................... 455/445; 370/255
See application file for complete search history.

(56) References Cited

U.S. PATENT DOCUMENTS

| | | | | |
|---|---|---|---|---|
| 7,295,544 B2 * | 11/2007 | Allen | ................... | H04W 40/02 370/255 |
| 2002/0173310 A1 * | 11/2002 | Ebata | ................... | H04L 45/122 455/445 |
| 2003/0040316 A1 * | 2/2003 | Stanforth | ................ | H04L 45/02 455/445 |
| 2006/0109815 A1 * | 5/2006 | Ozer | ................... | H04W 48/16 370/329 |
| 2006/0209720 A1 * | 9/2006 | Nelson | .................... | H04L 45/02 370/254 |
| 2006/0233184 A1 * | 10/2006 | Stanforth | .............. | H04W 88/16 370/401 |
| 2009/0190522 A1 * | 7/2009 | Horn | ................... | H04W 40/248 370/315 |
| 2009/0279487 A1 * | 11/2009 | Reumerman | ......... | H04W 40/24 370/329 |
| 2010/0232317 A1 * | 9/2010 | Jing | .................... | H04L 12/2807 370/254 |

(Continued)

OTHER PUBLICATIONS

"Creating a maritime wireless mesh infrastructure for real-time applications" Lambros Lambrinos et al., Glovecom Workshops (GC Wkshps), 2011 IEEE, Dec. 5, 2011, pp. 529-532, DOI: 10.11091 GLOCOM2011.6162506, ISBN: 978-1-4673-0039-1, 4 pages.

(Continued)

*Primary Examiner* — Mong-Thuy Tran
(74) *Attorney, Agent, or Firm* — Ziegler IP Law Group, LLC

(57) ABSTRACT

A communication system is provided. The system comprises a server arrangement; a plurality of mobile base stations coupled in communication with the server arrangement; and a plurality of mobile stations. A given mobile station from amongst the plurality of mobile stations is capable of communicating with two or more of the plurality of mobile base stations using radio communications. The server arrangement is operable to select, from amongst the two or more of the plurality of mobile base stations, a mobile base station to be used to route data to and/or from the given mobile station.

19 Claims, 7 Drawing Sheets

(56) References Cited

U.S. PATENT DOCUMENTS

| | | |
|---|---|---|
| 2010/0246445 A1 | 9/2010 | Scarlatti et al. |
| 2010/0248727 A1* | 9/2010 | Karaoguz ............... H04L 45/00 455/442 |
| 2011/0103284 A1* | 5/2011 | Gundavelli ............. H04L 12/18 370/312 |
| 2012/0195351 A1* | 8/2012 | Banwell ................. H04B 1/525 375/219 |
| 2012/0329448 A1* | 12/2012 | Lim ...................... H04W 92/20 455/422.1 |
| 2013/0099941 A1* | 4/2013 | Jana ...................... H04W 4/023 340/905 |
| 2014/0086191 A1 | 3/2014 | Berntsen et al. |
| 2014/0119316 A1* | 5/2014 | Linden .................. H04L 5/0048 370/329 |
| 2014/0179336 A1* | 6/2014 | Steer ..................... H04W 16/14 455/456.1 |
| 2015/0304983 A1* | 10/2015 | Krening .............. H04W 64/003 370/254 |
| 2016/0212689 A1* | 7/2016 | Linden .................. H04W 8/005 |

OTHER PUBLICATIONS

Extended European Search Report for Application No. 16150002.0-1857, mailed Jun. 13, 2016, 8 pages.

\* cited by examiner

CONTROLLING COMMUNICATIONS IN RADIO-BASED AD HOC NETWORKS

TECHNICAL FIELD

The present disclosure relates generally to radio communications; and more specifically, to systems for controlling communications in a radio-based ad hoc network. Moreover, the present disclosure relates to server arrangements for controlling communications in a radio-based ad hoc network. Furthermore, the present disclosure also concerns methods of controlling communications in a radio-based ad hoc network.

BACKGROUND

Facilitating data communication in remote locations, especially in the Polar Regions and remote land and sea regions, is challenging. For instance, modern maritime vessels require data communications for receiving route information and route updates, while remote mining facilities require data communications for transmitting measurement data to a central operating office. Also, personnel working in such remote locations require data communication for sending or receiving emails, instant messages, and voice and/or video calls.

In general, there are various applications of facilitating data communication to remote regions. However, there exists a need of such data communication services at reasonable costs and with high data transfer speeds.

It has been known for a long time that radio waves operating in a High Frequency (HF) band can carry information over long distances, in some circumstances over 10000 km. The HF band is typically used by international shortwave broadcasting stations, aviation communication systems, maritime sea-to-shore services, government time stations, weather stations, amateur radio and citizens band services, and Global Maritime Distress and Safety System (GMDSS).

However, radio technologies conventionally used in the HF band are ill-suited for data communications. Moreover, building a network of base stations for providing a good network capacity and coverage in the remote regions would be costly. Furthermore, managing a capacity of such a network would be challenging.

SUMMARY

The present disclosure seeks to provide an improved communication system for controlling communications in a radio-based ad hoc network.

The present disclosure also seeks to provide an improved method of controlling communications in a radio-based ad hoc network.

A further aim of the present disclosure is to at least partially overcome at least some of the problems of the prior art, as discussed above.

In a first aspect, embodiments of the present disclosure provide a communication system comprising:
  a server arrangement;
  a plurality of mobile base stations coupled in communication with the server arrangement; and
  a plurality of mobile stations, wherein a given mobile station from amongst the plurality of mobile stations is capable of communicating with two or more of the plurality of mobile base stations using radio communications, and further wherein the server arrangement is operable to select, from amongst the two or more of the plurality of mobile base stations, a mobile base station to be used to route data to and/or from the given mobile station.

In a second aspect, embodiments of the present disclosure provide a server arrangement for controlling communications in a radio-based ad hoc network, the radio-based ad hoc network comprising a plurality of mobile base stations and a plurality of mobile stations, the plurality of mobile base stations being coupled in communication with the server arrangement, and wherein a given mobile station from amongst the plurality of mobile stations is capable of communicating with two or more of the plurality of mobile base stations using radio communications,
  wherein the server arrangement is operable to select, from amongst the two or more of the plurality of mobile base stations, a mobile base station to be used to route data to and/or from the given mobile station.

In a third aspect, embodiments of the present disclosure provide a method of controlling communications in a radio-based ad hoc network, the radio-based ad hoc network comprising a plurality of mobile base stations and a plurality of mobile stations, the plurality of mobile base stations being coupled in communication with a server arrangement, the method comprising:
  creating a communication map comprising a list of mobile stations and/or mobile base stations that are reachable from a given mobile station and/or mobile base station;
  receiving a network-connectivity request from a first mobile station, via a first mobile base station; and
  using the communication map to select a second mobile base station to be used to route data to and/or from the first mobile station.

Embodiments of the present disclosure substantially eliminate or at least partially address the aforementioned problems in the prior art, enable radio stations to flexibly form a radio-based ad hoc network that can be used for data communication purposes, and enable controlling of communications so as to optimize a total capacity in the radio-based ad hoc network.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
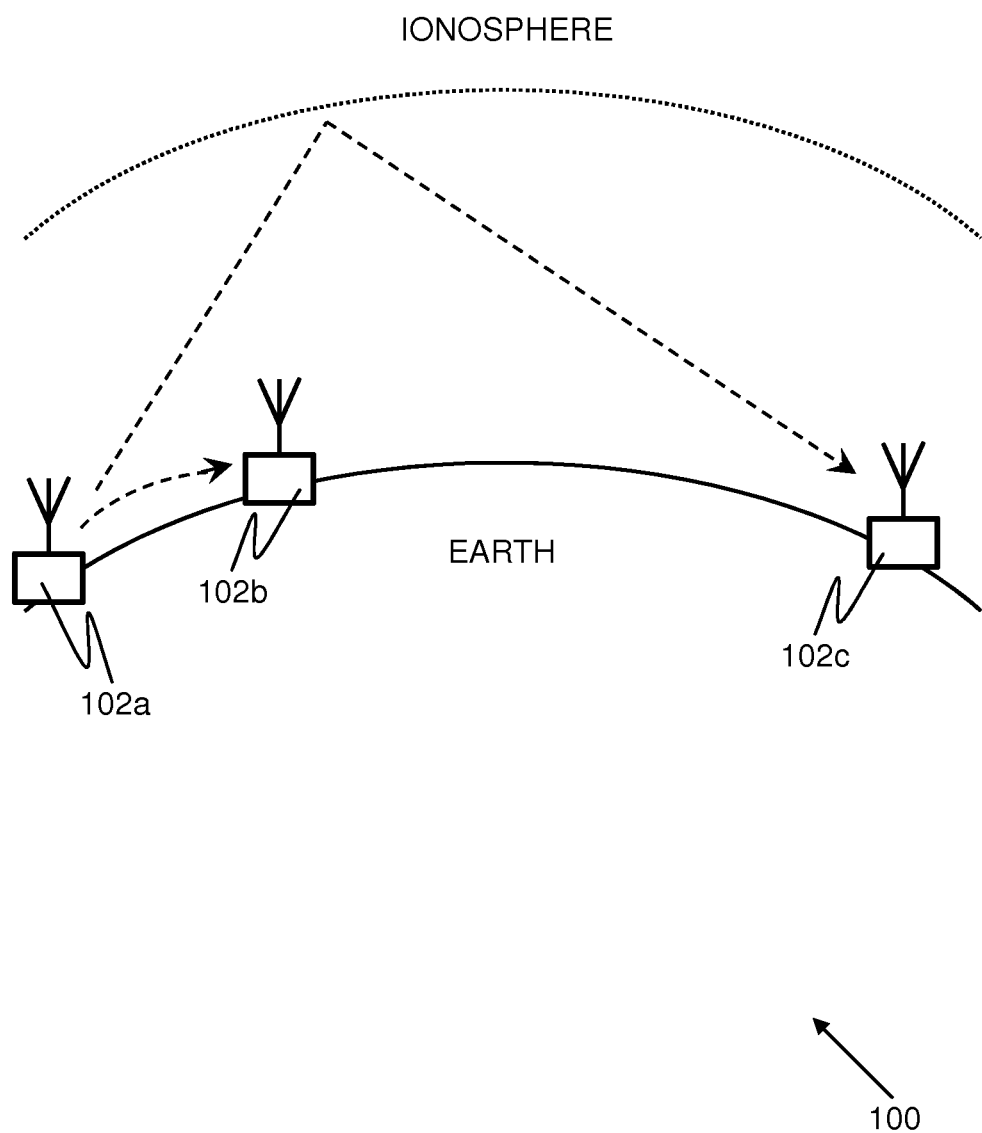
FIG. 1 is a schematic illustration of an example network environment that is suitable for practicing embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure has been disclosed, those skilled in the art would recognize that other embodiments for carrying out or practicing the present disclosure are also possible.

GLOSSARY

Brief definitions of terms used throughout the present disclosure are given below.

The term "radio station" generally refers to a communication apparatus that is capable of communicating with other similar communication apparatus using radio waves, via a radio communication interface. It is to be noted here that the term "radio station" only implies that the radio station can communicate using radio waves. In addition to the radio communication interface, the radio station can include other types of communication interfaces, which may be wired or wireless.

The term "base station" generally refers to a radio station that is fixed and has an access to a communication network, for example, such as the Internet. A base station is operable to relay network traffic to or from a mobile station.

The term "mobile station" generally refers to a radio station that is mobile.

The term "mobile base station" generally refers to a mobile station that is temporarily capable of acting as a base station. In other words, a mobile base station is a mobile station that has an access to a communication network, for example, such as the Internet. Thus, a mobile base station is operable to relay network traffic to or from a mobile station.

The term "ad hoc network" generally refers to a network that is established between a plurality of radio stations without any network planning with respect to infrastructure and/or frequency utilization.

The term "network administrator" generally refers to a server arrangement that is operable to control communications within an ad hoc network. A server arrangement typically includes one or more servers and one or more databases associated therewith. A network administrator is configured to allocate communication resources to mobile stations, namely fixed base stations and/or mobile base stations to be used for routing data to and/or from the mobile stations.

The term "capacity" generally refers to a network capacity of a radio-based ad hoc network. The network capacity can be measured as a sum of data transfer rates of all concurrent connections.

The term "capability announcement message" generally refers to a message that a radio station transmits to announce its communication capabilities to other radio stations. A capability announcement message typically comprises an identifier of a radio station that transmitted the capability announcement message and a network-access status of the radio station.

The term "identifier" generally refers to an identification code that uniquely identifies a radio station. In an example, the identifier can be a Media Access Control (MAC) address of the radio station.

The term "network-access status" generally refers to a parameter that is indicative of whether or not a given radio station has an access to a communication network. An example of the communication network is the Internet.

The term "station map" generally refers to one or more database tables that are used to store communication-capability information indicative of one or more mobile stations and/or mobile base stations that are available for communication and respective communication capabilities of the one or more mobile stations and/or mobile base stations. Each mobile station and/or mobile base station maintains its own station map locally.

The term "communication map" generally refers to one or more database tables that are used to store, for each mobile station and/or mobile base station, a list of mobile stations and/or mobile base stations that are reachable from that mobile station and/or mobile base station. A network administrator of an ad hoc network creates, updates and maintains a communication map. In some embodiments, the communication map stores communication capability information that is collected from station maps of a plurality of mobile stations and/or mobile base stations.

The term "high frequencies" or "HF" generally refers to an International Telecommunication Union (ITU) designation for a range of radio frequencies between 3 MHz and 30 MHz.

The term "surface wave" generally refers to a radio wave that propagates close to a ground surface of the Earth.

The term "sky wave" generally refers to a radio wave that propagates by utilizing ionospheric refractions and/or reflections.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the present disclosure provided herein, one of ordinary skill in the art will appreciate a variety of ways in which connection or coupling exists in accordance with the aforementioned definition.

The phrases "in an embodiment," "in accordance with an embodiment," and the like generally mean the particular feature, structure, or characteristic following the phrase is included in at least one embodiment of the present disclosure, and may be included in more than one embodiment of the present disclosure Importantly, such phrases do not necessarily refer to the same embodiment.

If the specification states a component or feature "may", "can", "could", or "might" be included or have a characteristic, that particular component or feature is not required to be included or have the characteristic.

In a first aspect, embodiments of the present disclosure provide a communication system comprising:

a server arrangement;

a plurality of mobile base stations coupled in communication with the server arrangement; and a plurality of mobile stations, wherein a given mobile station from amongst the plurality of mobile stations is capable of communicating with two or more of the plurality of mobile base stations using radio communications, and further wherein the server arrangement is operable to select, from amongst the two or more of the plurality of mobile base stations, a mobile base station to be used to route data to and/or from the given mobile station.

According to an embodiment, the given mobile station is operable to use its station map to select a mobile base station for relaying a network-connectivity request to the server arrangement. Details of how a station map can be used have been provided later in this section.

Additionally, optionally, the server arrangement is operable to transmit, to the given mobile station, information indicative of the mobile base station to be used.

According to an embodiment, the server arrangement is operable to determine a connection channel and/or a transmission power to be used for communication with the selected mobile base station. Optionally, the server arrangement is then operable to transmit, to the given mobile station, information indicative of the connection channel and/or the transmission power to be used for communication with the selected mobile base station.

In an example, in a certain geographical location at a certain time and date, the connection channel and/or the transmission power can be selected so as to provide a maximal coverage area. In another example, the connection channel and/or the transmission power can be selected so as to provide a minimal coverage area. The maximal coverage area has a potentially poorer Signal-to-Interference-plus-Noise-Ratio (SINR) than the minimal coverage area. In yet another example, the connection channel and/or the transmission power can be selected so as to provide a coverage ranging between the maximal coverage area and the minimal coverage area.

For illustration purposes only, there will now be considered an example wherein the communication system uses 20 possible frequency blocks, each of 192 kHz. Within each frequency block, there are 128 connection channels. Thus, there are 2560 available connection channels that can be used for radio communications. A radio communication typically uses one or more connection channels, for example, depending on a required data transfer rate. Moreover, each connection channel has different propagation characteristics for different transmission powers. As an example, with a transmission power of 100 watts (W), a coverage area may range from 100 km to 10000 km. Therefore, from a network capacity perspective, it is advantageous to control a connection channel and a transmission power to be used, at least for connections lasting more than a few seconds.

Furthermore, according to an embodiment, the server arrangement is operable to create a communication map comprising a list of mobile stations and/or mobile base stations that are reachable from a given mobile station and/or mobile base station. In other words, the communication map comprises, for each mobile station and/or mobile base station, a list of mobile stations and/or mobile base stations that are reachable from that mobile station and/or mobile base station. Thus, the communication map is indicative of mobile stations and mobile base stations that are able to communicate directly.

Optionally, the server arrangement is operable to use the aforementioned communication map when selecting the mobile base station to be used to route data.

Additionally, optionally, the server arrangement is operable to use the communication map to facilitate a multi-hop access for mobile stations that are unable to communicate with any mobile base station directly. In an example, a first mobile station can connect to a second mobile station, which can then connect to a mobile base station, so as to provide the first mobile station with a multi-hop access to a communication network, such as the Internet.

According to an embodiment, the server arrangement is operable to select the mobile base station to be used, based on at least one of:
(i) a communication latency;
(ii) an amount of data to be transferred;
(iii) an estimated length of a communication session required for communication;
(iv) predicted radio propagation properties on available connection channels;
(v) an available Quality-of-Service (QoS);
(vi) a connection price;
(vii) a current network load.

Optionally, with respect to the predicted radio propagation properties, the server arrangement is operable to receive information pertaining to the predicted radio propagation properties from one or more external sources. In an example, the server arrangement receives the information from a space weather station.

Optionally, with respect to the quality of service, the server arrangement is operable to select the mobile base station to be used in a manner that a connection with a sufficient quality of service is provided to the given mobile station.

Optionally, the server arrangement has knowledge of connection prices for each of the plurality of mobile base stations. Thus, optionally, the server arrangement is operable to select the mobile base station to be used in a manner that a cost of communication is minimized.

Optionally, with respect to the network load, the server arrangement is operable to select the mobile base station to be used in a manner that the network load is distributed amongst the plurality of mobile base stations. As an example, when some of the plurality of mobile base stations have high network load, the server arrangement routes network traffic via other mobile base stations that have less network load. This potentially enables the server arrangement to optimize a total capacity of a radio-based ad hoc network, which comprises the plurality of mobile stations and the plurality of mobile base stations.

Moreover, according to an embodiment, the server arrangement is operable to update the aforementioned communication map, as and when the server arrangement receives updates from the plurality of mobile stations and the plurality of mobile base stations. In this regard, optionally, each mobile station and/or mobile base station (hereinafter referred to as "receiving station", for the sake of convenience and clarity) is operable to:

receive one or more capability announcement messages from one or more other mobile stations and/or mobile base stations, wherein a given capability announcement message comprises an identifier of a given mobile station and/or mobile base station that transmitted the given capability announcement message, and a network-access status of the given mobile station and/or mobile base station, and optionally one or more of: a geographical location of the given mobile station and/or mobile base station, a time of transmission of the given capability announcement message, a connection price;

analyze the one or more capability announcement messages to gather analyzed communication-capability information indicative of the one or more other mobile stations and/or mobile base stations that are available for communication and respective communication capabilities of the one or more other mobile stations and/or mobile base stations;

update a station map, maintained locally at that mobile station and/or mobile base station, with the communication-capability information; and transmit the station map to the server arrangement.

Details of how the one or more capability announcement messages are analyzed have been described in respect of a published patent application US 2014/0119316 A1, hereby incorporated by reference in its entirety. Optionally, when analyzing the one or more capability announcement messages, the receiving station is operable to measure a received signal quality of each of the one or more capability announcement messages. Optionally, the received signal quality is measured in terms of one or more of: Signal-to-Noise Ratio (SNR), SINR, noise floor, and/or Modulation Error Ratio (MER). It is to be noted here that any other channel quality metric may be used.

Additionally, optionally, when analyzing the one or more capability announcement messages, the receiving station is operable to measure a bitrate with which each of the one or more capability announcement messages is received.

More additionally, optionally, when analyzing the one or more capability announcement messages, the receiving station is operable to determine a propagation mode of each of the one or more capability announcement messages. Optionally, in this regard, the receiving station is operable to determine whether a given capability announcement message was received as a surface wave or as a sky wave.

The determination of the propagation mode is for example based on propagation characteristics of radio waves. As ionospheric propagation introduces multipath, there are distinguishable echoes in a radio signal received by ionospheric propagation.

Optionally, in this regard, mobile stations and/or mobile base stations employ a code preamble that is mutually known to both transmitting and receiving stations. The code preamble is included in a capability announcement message. Examples of the code preamble include, but are not limited to, a Gold code and a Direct Sequence (DS) code. As an example, the code preamble can be 64 symbols long.

Optionally, the receiving station is operable to perform a correlation function between the code preamble and a received radio signal. If one visible spike is present, the received radio signal is determined to be a surface wave. On the other hand, if multiple spikes are present, the received radio signal is determined to be a sky wave. As the presence of multiple spikes is easily recognizable, the determination of the propagation mode can be performed by using a simple signal processing algorithm.

Moreover, all received radio signals need not to be processed to determine the propagation mode, as a distance between receiving and transmitting stations is known from their geographical locations and surface waves can only travel a certain distance affected by a time of day. In this regard, simple heuristics can be used. As an example, depending on a previous determination of a propagation mode for a given transmitting station and a time when the previous determination was made, a receiving station does not require to process other radio signals originating from the given transmitting station until there is a substantial change in a geographical location of at least one of the transmitting and receiving stations and/or in a distance between the transmitting and receiving stations.

According to an embodiment, the server arrangement is operable to receive station maps from the plurality of mobile stations and/or the plurality of mobile base stations, and is then operable to collect communication capability information stored in these station maps to update the aforementioned communication map.

According to an embodiment, the analyzed communication-capability information comprises one or more of: an available bitrate, one or more connection channels preferred for communication by the given mobile station and/or mobile base station, a signal quality per connection channel, a propagation mode per connection channel, an available quality of service per connection channel.

Furthermore, each mobile station and/or mobile base station (hereinafter referred to as "transmitting station", for the sake of convenience and clarity) is operable to transmit one or more capability announcement messages to other mobile stations and/or mobile base stations. Optionally, the capability announcement messages are broadcast messages that are not addressed to any specific mobile station and/or mobile base station. As a result, any mobile station or mobile base station that is capable of receiving the capability announcement messages may analyze these capability announcement messages, as described earlier.

Moreover, the transmission of the capability announcement messages can be triggered on a time-basis or on a need-basis. Optionally, in this regard, the transmitting station is operable to transmit the capability announcement messages periodically. A typical period may be, for example, every 10 minutes. Optionally, when transmitting the capability announcement messages on a time-basis, slight randomization can be used to avoid overlapping of radio signals originating from different transmitting stations. Alternatively or additionally, optionally, the transmitting station is operable to transmit the capability announcement messages upon detecting a change in its communication capabilities. In an example, communication capabilities of a mobile station and/or mobile base station with respect to sky waves may change depending on a time of day, a season of year, and a solar activity.

Moreover, when a mobile station achieves a connection to the Internet, the mobile station connects to the server arrangement to receive operating instructions from the server arrangement. Additionally, optionally, the mobile station informs the server arrangement about its geographical location. The server arrangement may then instruct the mobile station to start operating as a mobile base station. Alternatively, the server arrangement may instruct the mobile station to use already-existing mobile base stations that are available, for example, if a sufficient number of mobile base stations already exist in the same geographical area.

Moreover, according to an embodiment, the radio communications are facilitated via high frequency radio signals. For this purpose, each mobile station and/or mobile base station comprises a radio communication interface.

Moreover, according to an embodiment, the radio communications can be encrypted for security purposes. This may be particularly beneficial in a case where radio stations desire to communicate with only authorized radio stations. Thus, the communication system can be configured to facilitate secure communications.

Furthermore, according to an embodiment, the server arrangement comprises one or more email and/or instant message servers for buffering emails and/or instant messages to be delivered to the plurality of mobile stations. For the sake of simplicity, hereinafter an email and/or instant message is referred to as "email", while an email and/or instant message server is referred to as "email server".

Additionally, optionally, at least some of the plurality of mobile stations and the plurality of mobile base stations comprise a local email server. This potentially improves user experience, for example, as will be illustrated with an example below.

For illustration purposes only, there will now be considered an example wherein a given mobile station comprises a local email server, and requires an access to an email service on the Internet. When a user associated with the given mobile station sends an email, the email is received and stored at the local email server. When the given mobile station connects to an available mobile base station, the local email server of the given mobile station sends the email to the available mobile base station. Subsequently, the mobile base station relays the email to the server arrangement, which then relays the email to the email service on the Internet.

When an email is intended for a user associated with the given mobile station, the email is buffered at the email server of the server arrangement. The server arrangement then pushes the email to the given mobile station, when a connection session to the given mobile station is established via an available mobile base station. Optionally, in this regard, the server arrangement proactively establishes a connection to the given mobile station, via the available mobile base station. Thus, the email is relayed from the email server of the server arrangement to the local email server of the given mobile station, via the available mobile base station. If, at a given point of time, no connection to the given mobile station is available or an available mobile base station has high network load, the server arrangement buffers the email at its email server, and waits until a connection is available or the network load is reduced.

In this manner, the server arrangement is operable to facilitate various services, for example, including email, instant messages, and the like.

Moreover, according to an embodiment, network traffic to and/or from the plurality of mobile stations is routed via the server arrangement. This enables the server arrangement to control and monitor the network traffic. This potentially enables the server arrangement to use information pertaining to the network traffic, for example, such as an amount of data transferred and a length of a communication session, to determine usage charges for each of the plurality of mobile stations.

Moreover, as the network traffic is routed via the server arrangement, the server arrangement is operable to control routes to be used for communications. In this regard, optionally, the server arrangement is operable to switch an existing route with another route, namely from one mobile base station to another mobile base station, as and when required. As an example, the server arrangement may switch the routes so as to prevent and/or recover from error situations.

Furthermore, according to an embodiment, the station map is stored by way of one or more database tables. For illustration purposes only, there will now be considered a first example table that is maintained locally at a given mobile station.

| Station ID | Network-Access Status | Location | Available Bitrate | Connection Price |
|---|---|---|---|---|
| X | Yes | 58° 36' 13.5216" N 4° 50' 2.3424" E | 150 kbps | 100 Euros |
| Y | No | 60° 28' 28.3764" N 26° 37' 51.0924" W | — | — |
| Z | Yes | 46° 2' 11.8896" N 2° 22' 22.9692" W | 100 kbps | 50 Euros |

A key 'Station ID' denotes an identifier of a given mobile station and/or mobile base station, while a key 'Network-Access Status' denotes a network-access status of the given mobile station and/or mobile base station. A key 'Location' denotes a geographical location of the given mobile station and/or mobile base station. The geographical location may, for example, be denoted by Global Positioning System (GPS) coordinates or latitudes and longitudes of the given mobile station and/or mobile base station. The geographical location may be provided by Global Positioning System (GPS), Globalnaya navigatsionnaya sputnikovaya sistema (GLONASS) or other positioning or navigation system. A key 'Available Bitrate' denotes a bitrate that is available from the given mobile station and/or mobile base station, while a key 'Connection Price' denotes a price that is associated to relaying a connection to a communication network, such as the Internet. The system can be configured to levy cost (or price) of connection to parties involved with relaying connection to the communication network. The cost can be real cost related to telecommunication cost of a party which is connected to 3rd party commercial telecommunication network such as cellular network cost or relative cost. The cost and revenues can be distributed as credit points, money, free communication time, membership points and so forth.

In the first example table, the key 'Network-Access Status' has a value of 'YES' for a mobile base station, and a value of 'NO' for a mobile station.

When the given mobile station requires a connection to a communication network, the given mobile station selects, from amongst available mobile base stations, a target mobile base station for relaying a network-connectivity request to the server arrangement. Optionally, in this regard, the given mobile station prioritizes a list of available mobile base stations. Optionally, the available mobile base stations are prioritized based on one or more of: distances from the given mobile station, the available bitrates and/or the connection prices.

There will next be considered a second example table that is maintained locally at the given mobile station.

| Station ID | Radio Channel | Wave Mode | SNR | MER |
|---|---|---|---|---|
| X | Channel 1 | Sky wave | 2.4 | 6 dB |
| X | Channel 2 | Sky wave | 3 | 7 dB |
| X | Channel 3 | Surface wave | 4 | 10 dB |
| X | ... | ... | ... | ... |
| X | Channel 20 | Sky wave | 1.5 | 0 dB |
| Y | Channel 1 | Sky wave | 2.4 | 6 dB |
| Y | Channel 2 | Sky wave | 3 | 8 dB |
| Y | ... | ... | ... | ... |
| Y | Channel 20 | Surface wave | 1.5 | 0 dB |
| Z | Channel 1 | Sky wave | 2.4 | 6 dB |
| Z | Channel 2 | Sky wave | 3 | 8 dB |
| Z | ... | ... | ... | ... |
| Z | Channel 20 | Sky wave | 3 | 0 dB |

A key 'Radio Channel' denotes a given connection channel that is preferred for communication by a given mobile station and/or mobile base station, while a key 'Wave Mode' denotes a propagation mode of the given connection channel. A key 'SNR' denotes an SNR value of the given connection channel, while a key 'MER' denotes an MER value of the given connection channel.

Once a target mobile base station is selected, the given mobile station selects a connection channel to be used for communication with the target mobile base station. The connection channel may, for example, be selected based on the SNR and MER values and/or the propagation mode.

Moreover, optionally, the given mobile station is operable to select the connection channel to be used depending on one or more antenna-specific parameters, for example, such as polarization. In such a case, additional entries are required to be added to the second example table to take into account a received signal quality per antenna, per polarization.

It is to be noted here that the station map can alternatively be stored as a single database table, wherein the single database table can have at least some keys of the first and second example tables.

For illustration purposes only, there will now be considered an example network environment, wherein a plurality of radio stations are implemented pursuant to embodiments of the present disclosure. An example network environment has been illustrated in conjunction with FIG. 1 as explained in more detail below.

Embodiments of the present disclosure may be realized in a radio-based ad hoc radio comprising the plurality of radio stations.

These radio stations may be operationally equivalent to each other. At least some of these radio stations are free to move. At least one of these radio stations is configured to relay data packets from or to one or more other radio stations.

At least some of the radio stations have a very long communication range, and are capable of communicating directly with radio stations on the other side of the Earth.

The radio stations have transmit powers ranging from a few Watts (for example, 20 W) to even kilo Watts, depending on a type of power supply employed. For example, a radio station installed within a building, a truck, or a ship may utilize high transmit powers, while a radio station installed within a hand-held device may be limited to a few Watts.

Optionally, the radio stations utilize a frequency band comprising a High Frequency (HF) band. It is to be noted here that the radio stations may utilize other frequency bands, for example, such as a Very High Frequency (VHF) band or an Ultra-High Frequency (UHF) band. An advantage of HF radio waves is their long propagation range, and a fact that they may propagate via several types of communication paths, namely surface waves and sky waves.

Thus, the radio stations are configured to support radio communications on the HF band from which actual transmission frequencies can be selected according to a sub-method as described in US 2014/0119316 A1. The supported frequency band may be either continuous or divided into a plurality of frequency bands separated from each other. The division may be based on a fact that there are other radio stations occupying some frequencies that may have a priority to occupy those frequencies, while the radio stations have to adapt to the frequency occupation of the other radio stations. In an embodiment, various radio stations occupying a same frequency band have an equal priority to the frequency occupation. In this embodiment, the radio stations may utilize cognitive channel selection procedures as described in US 2014/0119316 A1, to avoid collisions between the radio stations.

Accordingly, the radio stations can be configured to use certain frequency bands, for example, depending on a bandwidth license that is issued to them.

For illustration purposes only, there will now be considered an example communication system, pursuant to embodiments of the present disclosure. One such example communication system has been illustrated in conjunction with FIG. 2, as explained in more detail below.

The example communication system includes a server arrangement, a plurality of mobile stations, and a plurality of mobile base stations. The plurality of mobile base stations are coupled in communication with the server arrangement.

The plurality of mobile base stations and the plurality of mobile stations form a radio-based ad hoc network. The server arrangement is operable to control communications within the radio-based ad hoc network, as will be elucidated in greater detail below. It is to be noted here that as reachable mobile base stations, for a given mobile station, are not static, conventional network dimensioning or planning is not applicable in the radio-based ad hoc network.

Optionally, the example communication system also includes one or more fixed base stations. In general, a fixed base station is a base station whose geographical location is fixed. On the other hand, a mobile base station is a mobile station that acts as a base station temporarily. The one or more fixed base stations are implemented in a manner that is similar to the implementation of the mobile base stations.

For illustrations purposes only, there will now be considered that each of the plurality of mobile stations and the plurality of mobile base stations in the above example communication system is typically implemented within a maritime vessel. Examples of such a maritime vessel include, but are not limited to, a cargo ship, a passenger ship, a special-purpose ship, a ferry, and a boat.

A mobile station having an access to a communication network can act as a mobile base station for other reachable mobile stations. In other words, the other reachable mobile stations can relay their network traffic through the mobile base station. When a maritime vessel reaches a coastal area, for example, such as a harbour, a mobile station implemented within the maritime vessel can access one or more communication networks and can act as a mobile base station. Examples of such communication networks include, but are not limited to, Local Area Networks (LANs), Wide Area Networks (WANs), Wireless LANs (WLANs), Wireless WANs (WWANs), the Internet, second generation (2G) telecommunication networks, third generation (3G) telecommunication networks, fourth generation (4G) telecommunication networks, and Worldwide Interoperability for Microwave Access (WiMAX) networks.

As described earlier, each mobile station and/or mobile base station analyzes capability announcement messages that it receives to gather communication-capability information, and updates its station map with the gathered information. Moreover, each mobile base station transmits its station map to the server arrangement, wherefrom the server arrangement updates a communication map that is maintained at the server arrangement. Furthermore, each mobile station may transmit its station map to the server arrangement, wherefrom the server arrangement updates a communication map that is maintained at the server arrangement.

Moreover, a given mobile station and/or mobile base station can communicate with one or more mobile stations and/or mobile base stations that are within a coverage area of the given mobile station and/or mobile base station. For this purpose, the given mobile station and/or mobile base station can communicate either with a lower bit rate via sky waves, or with a higher bit rate if radio communication via surface waves is available.

It is to be noted here that the coverage area of the given mobile station and/or mobile base station is dependent on propagation characteristics of sky waves, which are highly dependent on a connection channel used, a time of day, a location and ionospheric conditions. An example of how a coverage area may change has been illustrated in conjunction with FIGS. 5A-D, as explained in more detail below.

Furthermore, optionally, the communication system can be configured to provide various types of service levels within the radio-based ad hoc network. As an example, the various types of service levels that can be provided within the radio-based ad hoc network include at least one of:
(i) relay of emergency messages to and/or from a mobile station;
(ii) relay of important messages to and/or from the mobile station; and/or
(iii) relay of IP traffic related to passengers or crew of a maritime vessel.

An example of the emergency messages could be a distress call made by a captain of a ship. Some examples of the important messages include, but are not limited to, messages pertaining to route information to be used by a ship, a weather forecast information, and a fuel consumption information. The service levels (i) and (ii) require only small amounts of data to be transmitted.

Some examples of the IP traffic related to the passengers or the crew of the maritime vessel include, but are not limited to, IP traffic related to emails, instant messages, VoIP, and Internet browsing. The service level (iii) typically requires large amounts of data to be transmitted. The service level (iii) may also require longer communication sessions with a different quality of service, as compared to the service levels (i) and (ii).

Later, when selecting a mobile base station for routing data to and/or from a given mobile station, the server arrangement takes into account a service level required to transfer the data. An example of how a mobile base station can be selected based on a desired service level has been illustrated in conjunction with FIG. 4 as explained in more detail below.

In a second aspect, embodiments of the present disclosure provide a server arrangement for controlling communications in a radio-based ad hoc network, the radio-based ad hoc network comprising a plurality of mobile base stations and a plurality of mobile stations, the plurality of mobile base stations being coupled in communication with the server arrangement, and wherein a given mobile station from amongst the plurality of mobile stations is capable of communicating with two or more of the plurality of mobile base stations using radio communications, wherein the server arrangement is operable to select, from amongst the two or more of the plurality of mobile base stations, a mobile base station to be used to route data to and/or from the given mobile station.

According to an embodiment, the server arrangement is operable to determine a connection channel and/or a transmission power to be used for communication with the selected mobile base station.

According to an embodiment, the server arrangement is operable to create a communication map comprising a list of mobile stations and/or mobile base stations that are reachable from a given mobile station and/or mobile base station, and is operable to use the communication map when selecting the mobile base station to be used to route data.

According to an embodiment, the server arrangement is operable to select the mobile base station to be used, based on at least one of:
(i) a communication latency;
(ii) an amount of data to be transferred;
(iii) an estimated length of a communication session required for communication;
(iv) predicted radio propagation properties on available connection channels;
(v) an available quality of service;
(vi) a connection price;
(vii) a current network load in the radio-based ad hoc network.

According to an embodiment, the server arrangement comprises one or more email and/or instant message servers for buffering emails and/or instant messages to be delivered to the plurality of mobile stations.

In a third aspect, embodiments of the present disclosure provide a method of controlling communications in a radio-based ad hoc network, the radio-based ad hoc network comprising a plurality of mobile base stations and a plurality of mobile stations, the plurality of mobile base stations being coupled in communication with a server arrangement, the method comprising:
creating a communication map comprising a list of mobile stations and/or mobile base stations that are reachable from a given mobile station and/or mobile base station;
receiving a network-connectivity request from a first mobile station, via a first mobile base station; and using the communication map to select a second mobile base station to be used to route data to and/or from the first mobile station.

In some examples, the second mobile base station is different from the first mobile base station. In other examples, the second mobile base station is same as the first mobile base station.

According to an embodiment, the selecting the second mobile base station is performed based on at least one of:
(i) a communication latency;
(ii) an amount of data to be transferred;
(iii) an estimated length of a communication session required for communication;
(iv) predicted radio propagation properties on available connection channels;
(v) an available quality of service;
(vi) a connection price;
(vii) a current network load in the radio-based ad hoc network.

According to an embodiment, the method further comprises determining a connection channel and/or a transmission power to be used for communication with the selected mobile base station.

According to an embodiment, the method further comprises receiving, from the plurality of mobile stations and/or the plurality of mobile base stations, their respective station maps.

According to an embodiment, a given station map comprises one or more of: an identifier of a given mobile station and/or mobile base station, a network-access status of the given mobile station and/or mobile base station, a geographical location of the given mobile station and/or mobile base station, an available bitrate, a connection price, one or more connection channels preferred for communication by the given mobile station and/or mobile base station, a signal quality per connection channel, a propagation mode per connection channel, an available quality of service per connection channel.

According to an embodiment, the method further comprises buffering emails and/or instant messages to be delivered to the plurality of mobile stations.

DETAILED DESCRIPTION OF DRAWINGS

Referring now to the drawings, particularly by their reference numbers, FIG. 1 is a schematic illustration of an example network environment 100 that is suitable for practicing embodiments of the present disclosure. The network environment 100 includes a plurality of radio stations, depicted as a radio station 102a, a radio station 102b and a radio station 102c in FIG. 1. The radio stations 102a, 102b and 102c are hereinafter collectively referred to as radio stations 102.

Embodiments of the invention may be realized in a radio-based ad hoc network comprising the radio stations 102.

In FIG. 1, there is illustrated a scenario where the radio station 102a communicates with the radio station 102b via surface waves that propagate close to the ground surface of the Earth, and communicates with the radio station 102c on the other side of the Earth via sky waves that propagate by utilizing refractions from the ionosphere.

FIG. 1 is merely an example, which should not unduly limit the scope of the present disclosure. It is to be understood that the illustration of the network environment 100 is provided as an example and is not limited to a specific number and/or arrangement of radio stations. A person skilled in the art will recognize many variations, alternatives, and modifications of embodiments of the present disclosure.

Figure 2:
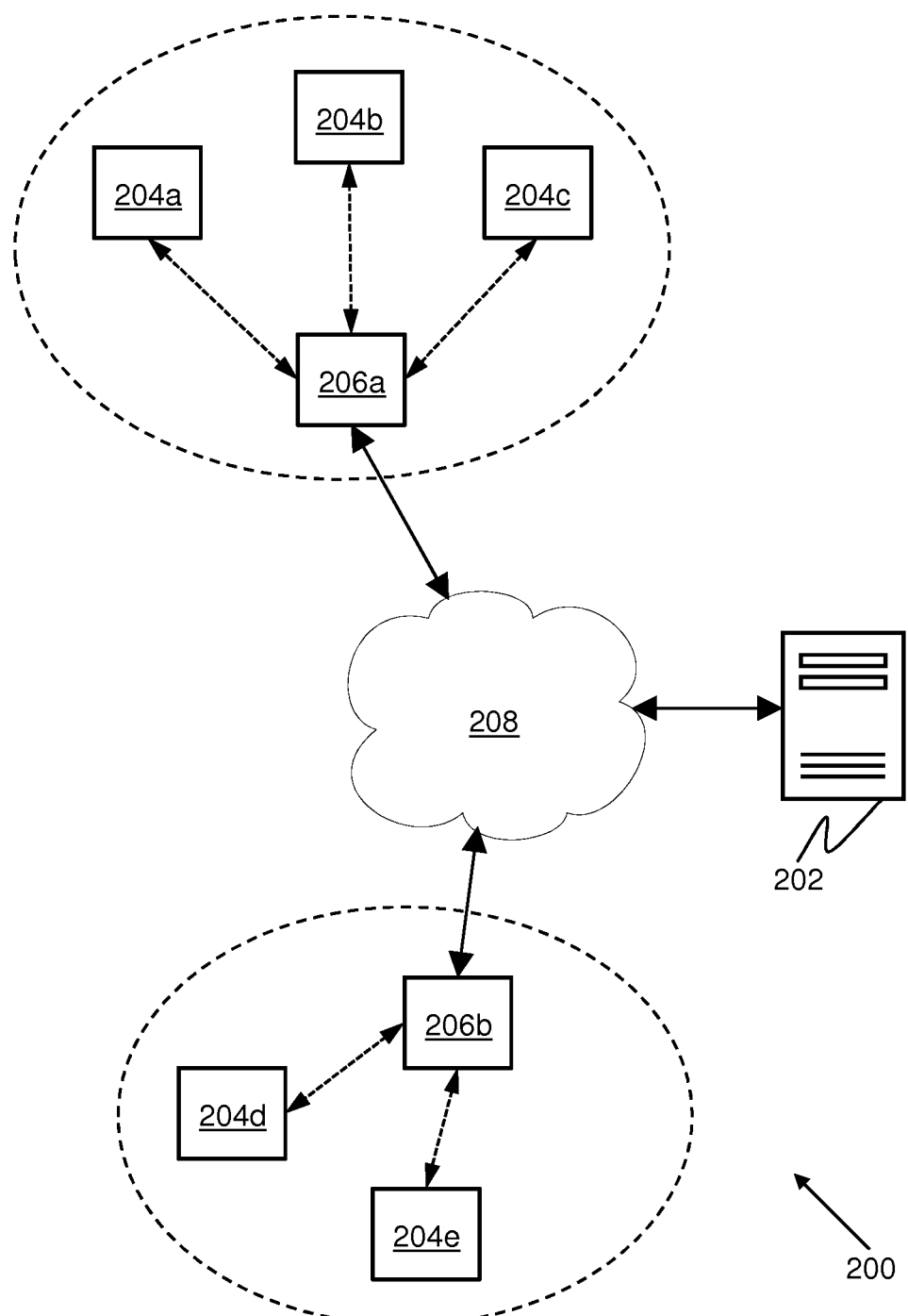
FIG. 2 is a schematic illustration of an example communication system, in accordance with an embodiment of the present disclosure.

FIG. 2 is a schematic illustration of an example communication system 200, in accordance with an embodiment of the present disclosure. The communication system 200 includes a server arrangement 202, a plurality of mobile stations, depicted as a mobile station 204a, a mobile station 204b, a mobile station 204c, a mobile station 204d and a mobile station 204e in FIG. 2 (hereinafter collectively referred to as mobile stations 204), and a plurality of mobile base stations, depicted as a mobile base station 206a and a mobile base station 206b in FIG. 2 (hereinafter collectively referred to as mobile base stations 206).

The mobile base stations 206 are coupled in communication with the server arrangement 202, via one or more communication networks, depicted as a communication network 208 in FIG. 2.

With reference to FIG. 2, the mobile stations 204a, 204b and 204c are within a coverage area of the mobile base station 206a, while the mobile stations 204d and 204e are within a coverage area of the mobile base station 206b. In other words, the mobile base station 206a can communicate with the mobile stations 204a, 204b and 204c, while the mobile base station 206b can communicate with the mobile stations 204d and 204e.

FIG. 2 is merely an example, which should not unduly limit the scope of the present disclosure. It is to be understood that the illustration of the communication system 200 is provided as an example and is not limited to a specific number and/or arrangement of server arrangements, mobile stations and mobile base stations. A person skilled in the art will recognize many variations, alternatives, and modifications of embodiments of the present disclosure. For example, in an alternative implementation, the communication system 200 can include one or more fixed base stations that are implemented in a manner that is similar to the implementation of the mobile base stations 206.

Figure 3:
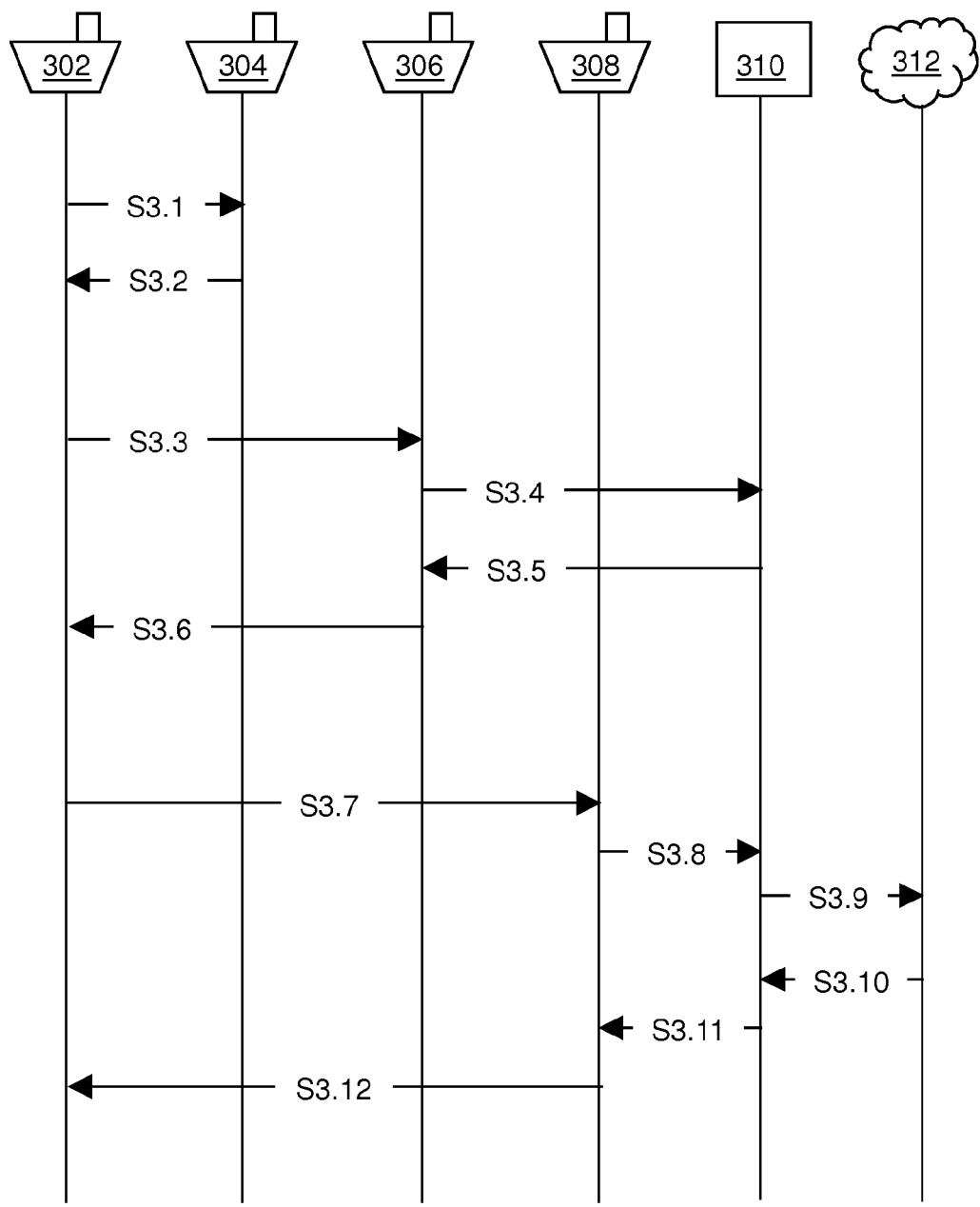
FIG. 3 is a schematic illustration of an example signal workflow when establishing a communication session from a mobile station, in accordance with an embodiment of the present disclosure.

FIG. 3 is a schematic illustration of an example signal workflow when establishing a communication session from a mobile station 302, in accordance with an embodiment of the present disclosure. With reference to FIG. 3, the mobile station 302 is capable of communicating with a mobile base station 304, a mobile base station 306 and a mobile base station 308, via radio communications. The mobile station 302 and the mobile base stations 304, 306 and 308 form a part of a radio-based ad hoc network.

For illustration purposes only, there will now be considered an example wherein each of the mobile station 302 and the mobile base stations 304, 306 and 308 is installed within a maritime vessel. In the example, a maritime vessel of the mobile station 302 is in a sea, while maritime vessels of the mobile base stations 304, 306 and 308 are in their respective harbours. As a result, the mobile station 302 has no direct network access to a server arrangement 310 and the Internet 312, while the mobile base stations 304, 306 and 308 have a network access to the server arrangement 310 and the Internet 312.

The example signal workflow corresponds to a situation when the mobile station 302 requires an Internet connection to access a web service available on the Internet 312.

Accordingly, the mobile station 302 uses its station map to prioritize available mobile base stations, namely the mobile base stations 304, 306 and 308. In the above example, let us assume that the mobile base station 304 has a higher priority than the mobile base station 306, which has a higher priority than the mobile base station 308.

At a step S3.1, the mobile station 302 connects to the mobile base station 304 and transmits a request message for an Internet access. The request message may, for example, include at least one of: an identifier of the mobile station 302, a geographical location of the mobile station 302, a service level required to access the web service, and/or information related to a radio environment as observed by the mobile station 302.

In the example, let us assume that the mobile base station 304 is unable to provide an Internet access to the mobile station 302. This may, for example, be a case when the mobile base station 304 requires a full bandwidth or if the mobile base station 304 has just lost the Internet connection. Thus, at a step S3.2, the mobile base station 304 transmits a message to the mobile station 302 indicating its inability to provide the Internet access. The message may, for example, include an updated network-access status and other related parameters.

Next, at a step S3.3, the mobile station 302 connects to the mobile base station 306 and transmits a request message for an Internet access.

At a step S3.4, the mobile base station 306 connects to the server arrangement 310, and relays the request message received from the mobile station 302 to the server arrangement 310.

Subsequently, the server arrangement 310 analyzes the request message, and uses its communication map to select a mobile base station to be used for routing data to and/or from the mobile station 302. When selecting the mobile base station, the server arrangement 310 takes into consideration one or more of following parameters: an available bitrate, a connection price, the required service level, and/or a current network load in the radio-based ad hoc network.

In the example, let us assume that the server arrangement 310 selects the mobile base station 308, instead of the mobile base station 306, for establishing a communication session to route data to and/or from the mobile station 302. Accordingly, at a step S3.5, the server arrangement 310 sends information indicative of the selected mobile base station (namely, the mobile base station 308 in this example) to the mobile base station 306. Subsequently, at a step S3.6, the mobile base station 306 forwards the information to the mobile station 302.

Next, at a step S3.7, the mobile station 302 establishes a communication session with the mobile base station 308.

Subsequently, at a step S3.8, the mobile base station 308 routes Internet Protocol (IP) data from the mobile station 302 to the server arrangement 310, which then routes the IP data to the web service in the Internet 312 at a step S3.9.

At steps S3.10, S3.11 and S3.12, IP data is routed from the web service to the mobile station 302, via a same route. As a result, the mobile station 302 has an Internet connection, wherein the IP data is routed via the server arrangement 310 and the mobile base station 308.

FIG. 3 is merely an example, which should not unduly limit the scope of the present disclosure. A person skilled in the art will recognize many variations, alternatives, and modifications of embodiments of the present disclosure.

Figure 4:
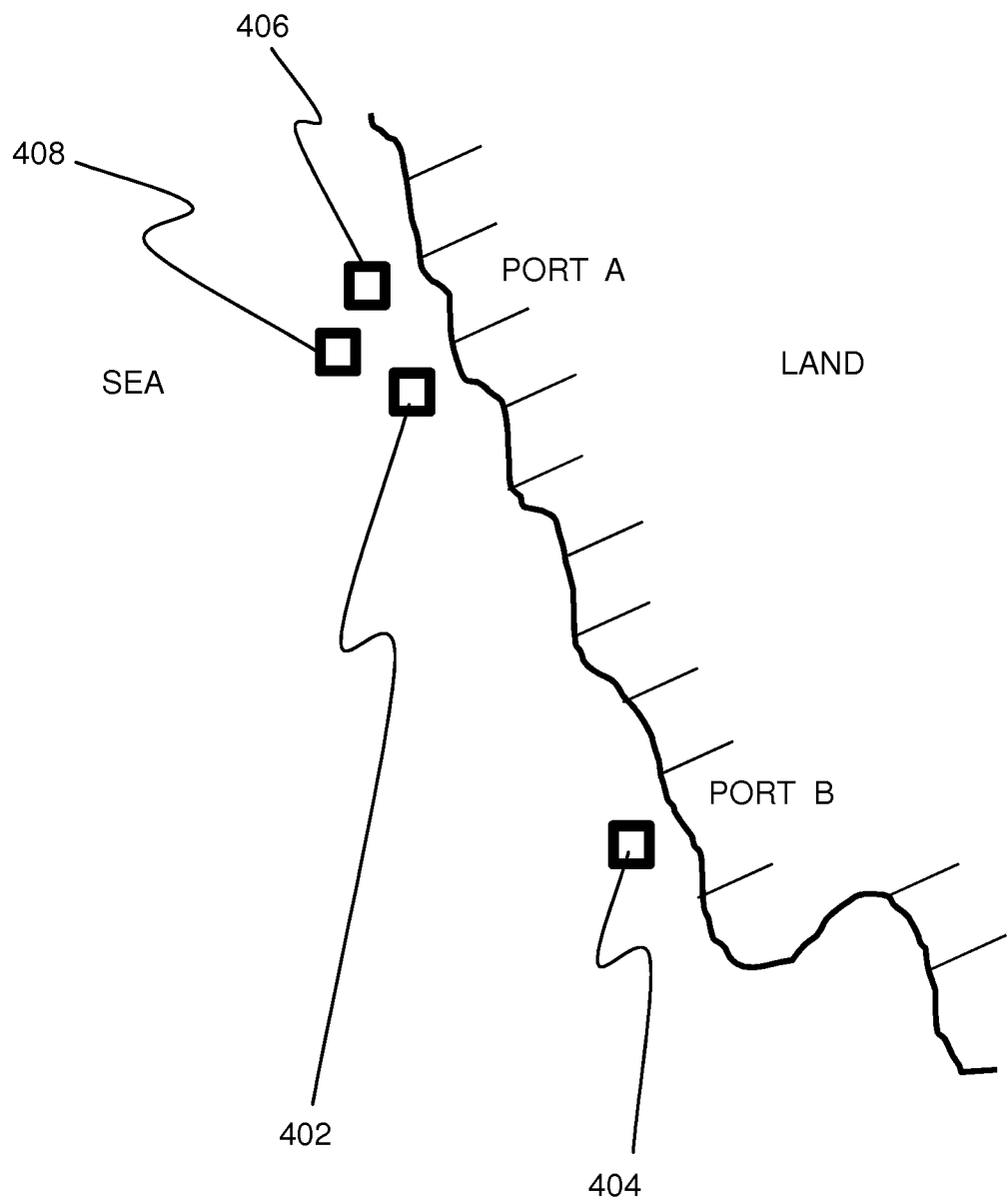
FIG. 4 is a schematic illustration of an example of how a mobile base station can be selected based on a desired service level, in accordance with an embodiment of the present disclosure.

FIG. 4 is a schematic illustration of an example of how a mobile base station can be selected based on a desired service level, in accordance with an embodiment of the present disclosure. In FIG. 4, there are shown two mobile base stations, namely a mobile base station 402 and a mobile base station 404, and two mobile stations, namely a mobile station 406 and a mobile station 408.

In the illustrated example, let us assume that the mobile base station 402 is installed on a ship that first arrived to a port 'A', and therefore, became a mobile base station. Similarly, the mobile base station 404 is installed on a ship that first arrived to a port 13', and therefore, became a mobile base station. The mobile stations 406 and 408 are installed on ships that later arrive to the port 'A'. As the mobile base station 402 is already operating from the port 'A' and a sufficient number of mobile base stations are available, the mobile stations 406 and 408 do not become mobile base stations.

In the example, let us also assume that both of the mobile base stations 402 and 404 are reachable from the mobile stations 406 and 408. Moreover, as mobile base station 402 is near the mobile stations 406 and 408, both of the mobile stations 406 and 408 can communicate with the mobile base station 402 via a wideband radio connection, namely surface waves. Let us also assume that the mobile base station 404 is far away from the mobile stations 406 and 408, such that both of the mobile stations 406 and 408 can communicate with the mobile base station 404 via a narrowband radio connection, namely sky waves.

In addition, let us assume that the mobile station 406 requires an Internet connection for data transfer, while the mobile station 408 requires an Internet connection for making Voice over IP (VoIP) calls. Accordingly, the mobile stations 406 and 408 send network-connectivity requests to a server arrangement, wherein their network-connectivity requests indicate a service level required.

Subsequently, the server arrangement selects the mobile base station 402 for routing data to and/or from the mobile station 406. As an amount of data to be transferred is known, it is generally preferred from a network point-of-view to serve data transfer through a fastest way available, which is via the mobile base station 402 in the illustrated example.

On the other hand, the server arrangement selects the mobile base station 404 for routing VoIP calls to and/or from the mobile station 408, as a VoIP connection requires only a few kilobits of transfer speed and a length of the VoIP connection cannot be predicted.

In this manner, the server arrangement takes into account a service level required when selecting a mobile base station for routing.

FIG. 4 is merely an example, which should not unduly limit the scope of the present disclosure. A person skilled in the art will recognize many variations, alternatives, and modifications of embodiments of the present disclosure.

FIGS. 5A, 5B, 5C and 5D are schematic illustrations of how a coverage area may change with variations in propagation properties of sky waves.

In FIGS. 5A-D, there is shown a mobile station 510, which is installed within a maritime vessel travelling on a northern route. There are also shown mobile base stations 512a, 512b, 512c, 512d and 512e (hereinafter collectively referred to as mobile base stations 512). The mobile base stations 512 are installed within maritime vessels that are located in their respective harbours.

In FIGS. 5A-D, there is also shown a limit of usable communication 520, namely a coverage area of the mobile station 510. The limit of usable communication 520 defines a region within which radio waves can propagate as sky waves. This region typically lies inside circles or north of a line. In particular, this region lies north of a line shown in FIGS. 5A and 5B, and lies inside circles shown in FIGS. 5C and 5D.

Figure 5A:
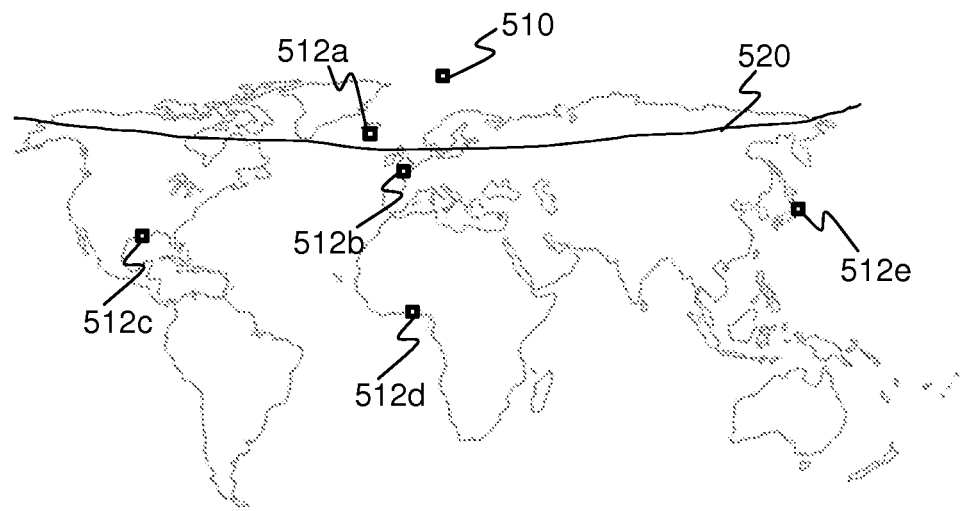
FIGS. 5A, 5B, 5C and 5D are schematic illustrations of how a coverage area may change with variations in propagation properties of sky waves.
Figure 5B:
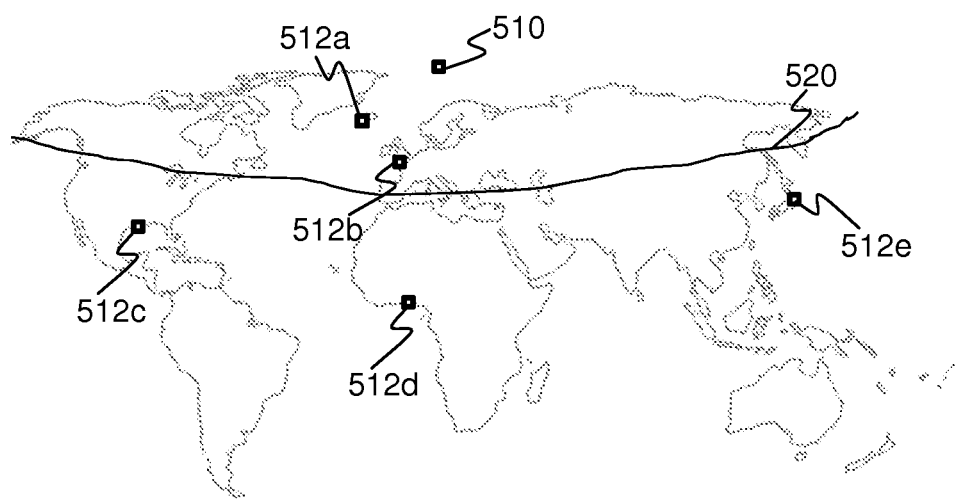

FIGS. 5A and 5B correspond to radio communications occurring via a connection channel of 3.7 MHz using a transmission power of 100 W. Moreover, FIG. 5A corresponds to the radio communications occurring at Coordinated Universal Time (UTC) 00:00 hours, while FIG. 5B corresponds to the radio communications occurring at UTC 12:00 hours.

Figure 5C:
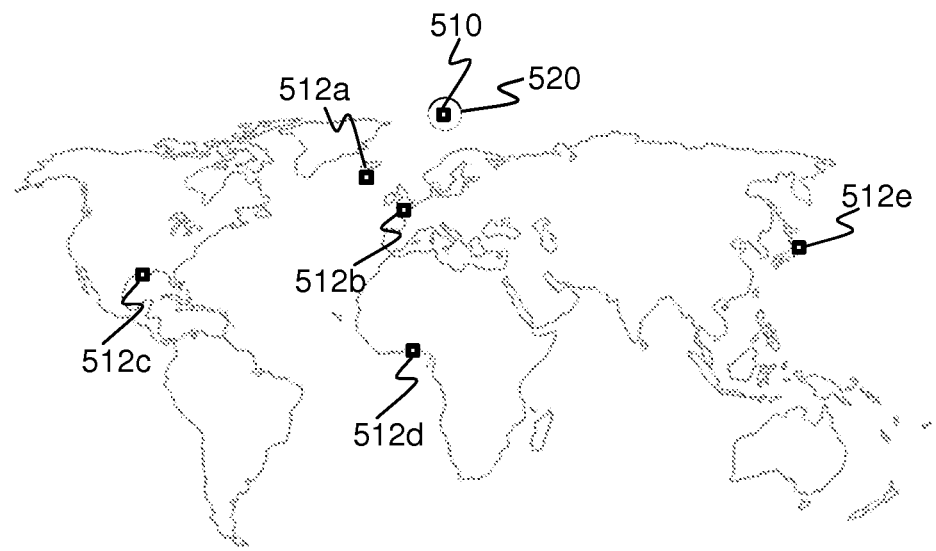
Figure 5D:
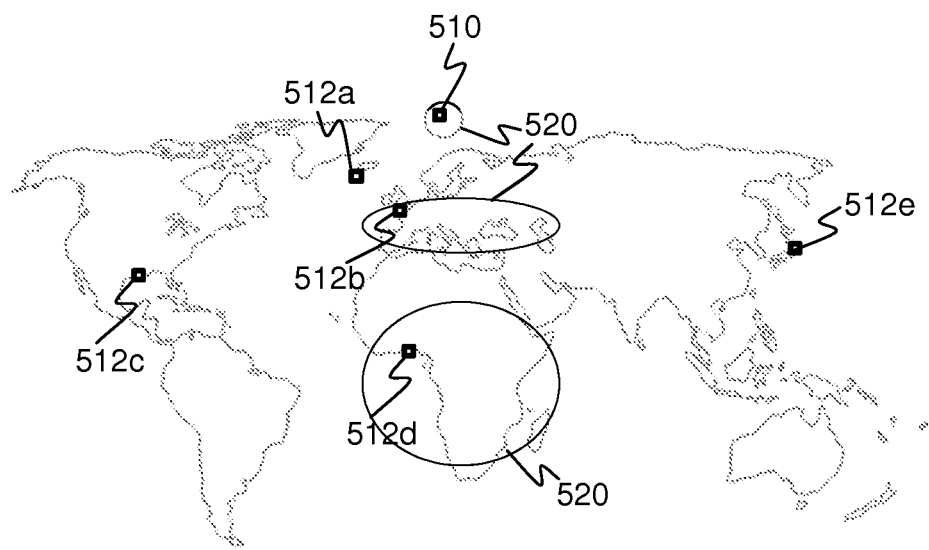

FIGS. 5C and 5D correspond to radio communications occurring via a connection channel of 28 MHz using a transmission power of 100 W. FIG. 5C corresponds to the radio communications occurring at UTC 00:00 hours, while FIG. 5D corresponds to the radio communications occurring at UTC 12:00 hours.

Moreover, FIGS. 5A-D correspond to the radio communications occurring on a same day.

It is evident from FIGS. 5A and 5B that, when using the connection channel of 3.7 MHz, the mobile station 510 can communicate with only the mobile base station 512a at UTC 00:00 hours, but can communicate with the mobile base stations 512a and 512b at UTC 12:00 hours. Likewise, it is evident from FIGS. 5C and 5D that, when using the connection channel of 28 MHz, the mobile station 510 cannot communicate with any mobile base station at UTC 00:00 hours, but can communicate with the mobile base stations 512b and 512d at UTC 12:00 hours.

It is to be appreciated that radio communications via sky waves are dependent on a time of the day, a connection channel used and a location, and may be significantly irregular. Thus, in order to update each other, the mobile station 510 and the mobile base stations 512 broadcast capability announcement messages on a time-basis or on a need-basis, as described earlier.

FIGS. 5A-D are merely examples, which should not unduly limit the scope of the present disclosure. A person skilled in the art will recognize many variations, alternatives, and modifications of embodiments of the present disclosure.

Figure 6:
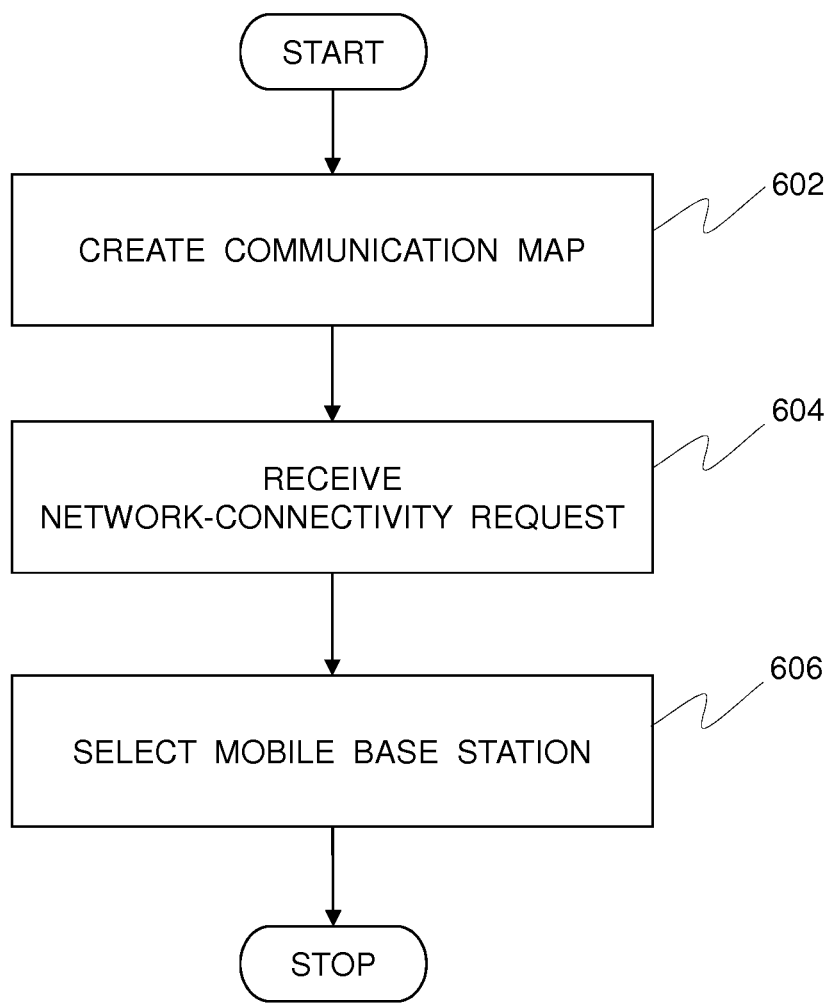
FIG. 6 is an illustration of steps of a method of controlling communications in a radio-based ad hoc network, in accordance with an embodiment of the present disclosure.

FIG. 6 is an illustration of steps of a method of controlling communications in a radio-based ad hoc network, in accordance with an embodiment of the present disclosure. The method is depicted as a collection of steps in a logical flow diagram, which represents a sequence of steps that can be implemented in hardware, software, or a combination thereof.

The radio-based ad hoc network comprises a plurality of mobile base stations and a plurality of mobile stations. The plurality of mobile base stations are coupled in communication with a server arrangement.

At a step 602, the server arrangement creates a communication map comprising a list of mobile stations and/or mobile base stations that are reachable from a given mobile station and/or mobile base station, as described earlier.

At a step 604, the server arrangement receives a network-connectivity request from a first mobile station, via a first mobile base station.

Subsequently, at a step 606, the server arrangement uses the communication map to select a second mobile base station to be used to route data to and/or from the first mobile station.

In some examples, the second mobile base station is different from the first mobile base station. In other examples, the second mobile base station could be same as the first mobile base station.

The steps 602 to 606 are only illustrative and other alternatives can also be provided where one or more steps are added, one or more steps are removed, or one or more steps are provided in a different sequence without departing from the scope of the claims herein.

Embodiments of the present disclosure are susceptible to being used for various purposes, including, though not limited to, enabling radio stations to flexibly form a radio-based ad hoc network that can be used for data communication purposes, and enabling controlling of communications so as to optimize a total capacity in the radio-based ad hoc network.

Modifications to embodiments of the present disclosure described in the foregoing are possible without departing from the scope of the present disclosure as defined by the accompanying claims. Expressions such as "including", "comprising", "incorporating", "consisting of" "have", "is" used to describe and claim the present disclosure are intended to be construed in a non-exclusive manner, namely allowing for items, components or elements not explicitly described also to be present. Reference to the singular is also to be construed to relate to the plural.

We claim:

1. A communication system comprising:
a server arrangement;
a plurality of mobile base stations coupled in communication with the server arrangement; and
a plurality of mobile stations, wherein a given mobile station from amongst the plurality of mobile stations is capable of communicating with two or more of the plurality of mobile base stations using radio communications,
wherein each of the mobile base stations and mobile stations is operable to:
receive a capability announcement message from one or more other mobile base stations or mobile stations comprising communication-capability information including:
an identifier of the mobile base station or mobile station that transmitted the capability announcement message;
a network-access status of the mobile base station or mobile station; and
a geographical location of the mobile base station or mobile station;
update a station map, maintained locally, with the communication-capability information; and
transmit the station mad to the server arrangement,
wherein the server arrangement is operable to use the station maps to update a communication map used to select, from amongst the two or more of the plurality of mobile base stations, a mobile base station to be used to route data to and/or from the given mobile station.

2. The communication system of claim 1, wherein the server arrangement is operable to determine a connection channel and/or a transmission power to be used for communication with the selected mobile base station.

3. The communication system of claim 1, wherein the server arrangement is operable to create the communication map as comprising a list of mobile stations and/or mobile base stations that re reachable from other mobile stations or mobile base stations.

4. The communication system of claim 1, wherein the server arrangement is operable to select the mobile base station to be used, based on at least one of the following additional criteria:
a communication latency;
an amount of data to be transferred;
an estimated length of a communication session required for communication;
predicted radio propagation properties on available connection channels;
an available quality of service;
a connection price;
a current network load.

5. The communication system of claim 1, wherein the communication-capability information comprises one or more of a time of transmission of the capability announcement message or a connection price.

6. The communication system of claim 1, wherein the given mobile station is operable to use its station map to select a mobile base station for relaying a network-connectivity request to the sever arrangement.

7. The communication system of claim 1, wherein the communication-capacity information comprises one or more of: an available bitrate, one or more connection channels preferred for communication by the given mobile station, a signal quality per connection channel, a propagation mode per connection channel, an available quality of service per connection channel.

8. The communication system of claim 1, wherein the radio communications are facilitated via high frequency radio signals.

9. The communication system of claim 1, wherein the server arrangement comprises one or more of:
   at least one email server for buffering emails to be delivered to the plurality of mobile stations; or
   at least one instant message server for buffering instant messages to be delivered to the plurality of mobile stations.

10. A server arrangement for controlling communications in a radio-based ad hoc network, the radio-based ad hoc network comprising a plurality of mobile base stations and a plurality of mobile stations, the plurality of mobile base stations being coupled in communication with the server arrangement,
   wherein a given mobile station from amongst the plurality of mobile stations is capable of communicating with two or more of the plurality of mobile base stations using radio communications,
   wherein each of the mobile base stations and mobile stations is operable to:
      receive a capability announcement message from one or more other mobile base stations or mobile stations comprising communication-capability information including:
         an identifier of the mobile base station or mobile station that transmitted the capability announcement message;
         a network-access status the mobile base station or motile station; and
         a geographical location of the mobile base station or mobile station;
      update a station map, maintained locally, with the communication-capability information; and
      transmit the station map to the server arrangement,
   wherein the server arrangement is operable to use the station maps to update a communication map and use the communication map to select, from amongst the two or more of the plurality of mobile base stations, a mobile base station to be used to route data to and/or from the given mobile station.

11. The server arrangement of claim 10, wherein the server arrangement s operable to determine a connection channel and/or a transmission power to be used for communication with the selected mobile base station.

12. The server arrangement of claim 10, wherein the server arrangement is operable to create the communication map as comprising a list of mobile stations and/or mobile base stations that are reachable from a other mobile stations or mobile base stations.

13. The server arrangement of claim 10, wherein the server arrangement is operable to elect the mobile base station to be used, based on at least one of the following additional criteria:
   a communication latency;
   an amount of data to be transferred;
   an estimated length of a communication session required for communication;
   predicted radio propagation properties on available connection channels;
   an available quality of service;
   a connection price;
   a current network load in the radio-based ad hoc network.

14. The server arrangement of claim 10, wherein the server arrangement comprises one or more of:
   at least one email for buffering emails to be delivered to the plurality of mobile stations; or
   at least one instant message server for buffering instant messages to be delivered to the plurality of mobile stations.

15. A method of controlling communications in a radio-based ad hoc network, the radio-based ad hoc network comprising a plurality of mobile base stations and a plurality of mobile stations, the plurality of mobile base stations being coupled in communication with a server arrangement, the method comprising:
   using each of the mobile base stations and mobile stations to:
      receive a capability announcement message from one or more other mobile base stations or mobile stations comprising communication-capability information including:
         an identifier of the mobile base station or mobile station that transmitted the capability announcement message;
         a network-access status of the mobile base station or mobile station; and
         a geographical location of the mobile base station or mobile station;
      update a station map, maintained locally, with the communication-capability information; and
      transmit the station map to the server arrangement,
   using the server arrangement to:
      create a communication map comprising a list of mobile stations and/or mobile base stations that are reachable from a given mobile station and/or mobile base station;
      use the station mans to update the communication map;
      receive a network-connectivity request from a first mobile station, via a first mobile base station; and
      use the communication map to select a second mobile base station to be used to route data to and/or from the first mobile station.

16. The method of claim 15, wherein the second mobile base station is different from the first mobile base station.

17. The method of claim 15, wherein the selecting the second mobile base station Is performed based on at least one of the following additional criteria:
   a communication latency;
   an amount of data to be transferred;
   an estimated length of a communication session required for communication;
   predicted radio propagation properties on available connection channels;
   an available quality of service;
   a connection price;
   a current network load in the radio-based ad hoc network.

18. The method of claim 15 further comprising determining a connection channel and/or a transmission power to be used for communication with the selected mobile base station.

19. The method of claim 15 further comprising buffering emails and/or instant messages to be delivered to the plurality of mobile stations.

* * * * *